United States Patent
Henry et al.

(10) Patent No.: US 8,370,684 B2
(45) Date of Patent: Feb. 5, 2013

(54) MICROPROCESSOR WITH SYSTEM-ROBUST SELF-RESET CAPABILITY

(75) Inventors: G. Glenn Henry, Austin, TX (US);
Darius D. Gaskins, Austin, TX (US);
Jason Chen, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 334 days.

(21) Appl. No.: 12/944,269

(22) Filed: Nov. 11, 2010

(65) Prior Publication Data

US 2011/0202796 A1    Aug. 18, 2011

Related U.S. Application Data

(60) Provisional application No. 61/304,887, filed on Feb. 16, 2010.

(51) Int. Cl.
*G06F 11/26* (2006.01)
(52) U.S. Cl. .............................. 714/23; 714/30
(58) Field of Classification Search .................. 714/23, 714/30
See application file for complete search history.

(56) References Cited

U.S. PATENT DOCUMENTS

| | | | |
|---|---|---|---|
| 6,438,709 B2 * | 8/2002 | Poisner | 714/23 |
| 6,463,529 B1 * | 10/2002 | Miller et al. | 713/2 |
| 6,687,865 B1 | 2/2004 | Dervisoglu et al. | |
| 2001/0042198 A1 * | 11/2001 | Poisner | 713/2 |
| 2007/0180315 A1 * | 8/2007 | Aizawa | 714/15 |
| 2007/0209072 A1 * | 9/2007 | Chen | 726/16 |
| 2008/0016405 A1 * | 1/2008 | Kitahara | 714/43 |
| 2011/0010530 A1 | 1/2011 | Henry et al. | |
| 2011/0010531 A1 | 1/2011 | Henry et al. | |
| 2011/0053649 A1 * | 3/2011 | Wilson | 455/566 |
| 2011/0143809 A1 * | 6/2011 | Salomone et al. | 455/550.1 |
| 2011/0185153 A1 | 7/2011 | Henry et al. | |
| 2011/0185160 A1 | 7/2011 | Gaskins et al. | |
| 2011/0202796 A1 | 8/2011 | Henry et al. | |
| 2012/0185681 A1 | 7/2012 | Henry et al. | |

FOREIGN PATENT DOCUMENTS

CN    101000596    7/2007
JP    62256298 A  * 11/1987

* cited by examiner

*Primary Examiner* — Chae Ko
(74) *Attorney, Agent, or Firm* — E. Alan Davis; James W. Huffman

(57) ABSTRACT

A microprocessor includes a bus interface unit that interfaces the microprocessor to a bus that includes a signal that, when asserted, instructs all bus agents to refrain from initiating bus transactions. Microcode causes the bus interface unit to assert the signal in response to detecting an event and resets the microprocessor, but does not reset a portion of the bus interface unit that asserts the signal on the bus. After the reset, the microcode causes the bus interface unit to deassert the signal on the bus. Additionally, the microcode sets a flag and saves the microprocessor state to memory before resetting itself, but does not reset the interrupt controller. After the reset, the microcode reloads the state of the microprocessor from the memory. However, if the microcode determines that the flag is set, it forgoes reloading the state of the interrupt controller.

29 Claims, 2 Drawing Sheets

MICROPROCESSOR WITH SYSTEM-ROBUST SELF-RESET CAPABILITY

CROSS REFERENCE TO RELATED APPLICATION(S)

This application claims priority based on U.S. Provisional Application Ser. No. 61/304,887, filed Feb. 16, 2010, entitled MICROPROCESSOR WITH SYSTEM-ROBUST SELF-RESET CAPABILITY, which is hereby incorporated by reference in its entirety.

FIELD OF THE INVENTION

The present invention relates in general to the field of microprocessors, and particularly to microprocessors that reset themselves.

BACKGROUND OF THE INVENTION

Debugging a modern microprocessor can be a very difficult enterprise. Microprocessor developers employ various techniques to attempt to reproduce bugs and obtain information to gain insight into their causes. The techniques may include features of the microprocessor that alter its operation from a normal mode, which may result in interactions between the microprocessor and other system components that vary from normal operation and which are unexpected by the other system components. These abnormal interactions may have unintended consequences that prevent effect debugging.

BRIEF SUMMARY OF INVENTION

In one aspect the present invention provides a microprocessor capable of partially resetting itself. The microprocessor includes a bus interface unit configured to interface the microprocessor to a bus, wherein the bus includes a signal that, when asserted, instructs all agents on the bus to refrain from initiating a transaction on the bus. The microprocessor also includes microcode, configured to: cause the bus interface unit to assert the signal on the bus, in response to detecting an event; reset the microprocessor, but not reset a portion of the bus interface unit that asserts the signal on the bus; and cause the bus interface unit to deassert the signal on the bus, after the microprocessor is reset.

In another aspect, the present invention provides a method for a microprocessor to partially reset itself, wherein the microprocessor includes a bus interface unit that interfaces the microprocessor to a bus, wherein the bus includes a signal that, when asserted, instructs all agents on the bus to refrain from initiating a transaction on the bus. The method includes the microprocessor asserting the signal on the bus in response to detecting an event. The method also includes the microprocessor resetting itself after asserting the signal on the bus, but refraining from resetting a portion of the bus interface unit that is asserting the signal on the bus. The method also includes the microprocessor deasserting the signal on the bus after resetting the microprocessor.

In yet another aspect, the present invention provides a microprocessor configured to partially reset itself. The microprocessor includes an interrupt controller and microcode. The microcode is configured to: set a flag, in response to detecting an event; save a state of the microprocessor to a memory, in response to detecting the event; reset the microprocessor after setting the flag and saving the state, but not reset the interrupt controller; and reload the state of the microprocessor from the memory, after resetting the microprocessor, wherein if the microcode determines that the flag is set, the microcode forgoes reloading the state of the interrupt controller.

In yet another aspect, the present invention provides a method for a microprocessor to partially reset itself, wherein the microprocessor includes an interrupt controller. The method includes the microprocessor setting a flag within the microprocessor, in response to detecting an event. The method also includes the microprocessor saving a state of the microprocessor to a memory, in response to detecting the event. The method also includes the microprocessor resetting itself after setting the flag and saving the state, but refraining from resetting the interrupt controller. The method also includes the microprocessor reloading the state of the microprocessor from the memory after said resetting itself, wherein reloading the state of the microprocessor comprises determining whether the flag is set and forgoing reloading the state of the interrupt controller if the flag is set.

DETAILED DESCRIPTION OF THE INVENTION

Figure 1:
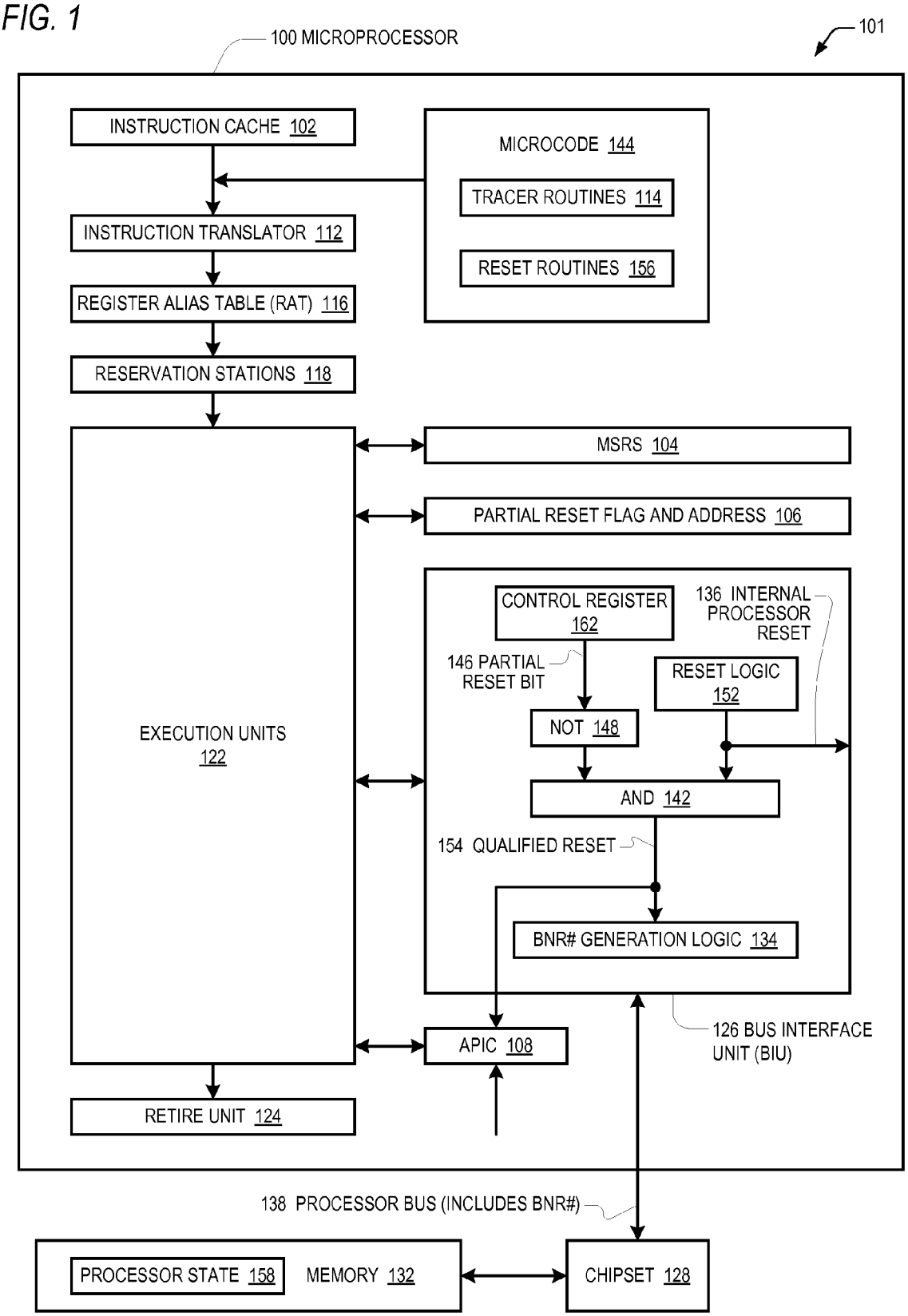
FIG. 1 is a block diagram illustrating a system that includes a partially self-resetting microprocessor according to the present invention.

Referring now to FIG. 1, a block diagram illustrating a system 101 that includes a partially self-resetting microprocessor 100 according to the present invention is shown. The system includes a system memory 132 coupled to and controlled by a chipset 128. The system memory 132 may be used to store a processor state 158, as discussed in more detail below. The chipset 128 is coupled to the microprocessor 100 by a processor bus 138. According to one embodiment, the processor bus 138 includes a block next request (BNR#) signal. Assertion of the BNR# signal by an agent on the bus 138, such as the microprocessor 100 or chipset 128, throttles the other agents from initiating a new transaction on the bus 138. The microprocessor 100 advantageously asserts BNR# while it is resetting itself to prevent hangs on the bus 138, as discussed in more detail below.

The microprocessor 100 includes a pipeline of stages that includes various functional units. The pipeline includes an instruction cache 102, coupled to an instruction translator 112, coupled to a register alias table (RAT) 116, coupled to reservation stations 118, coupled to execution units 122, coupled to a retire unit 124.

The instruction translator 112 translates macroinstructions (e.g., of the x86 architecture) into microinstructions of the microinstruction set of a RISC-like microarchitecture of the microprocessor 100. The reservation stations 118 issue instructions to the execution units 122 for execution out of program order. The retire unit 124 includes a reorder buffer that enforces retirement of instructions in program order. The execution units 122 include a load/store unit, integer units, floating-point units, branch units, or SIMD units.

The microprocessor 100 also includes an advanced programmable interrupt controller (APIC) 108 coupled to the execution units 122 and to a bus interface unit 126 that interfaces the microprocessor 100 to the processor bus 138. The APIC 108 receives interrupts from various interrupt sources within the system 101, such as the chipset 128 and peripheral devices, and sends the interrupts to the core of the microprocessor 100 which handles the interrupts. In one embodiment, the APIC 108 performs functions similar to those of a local APIC described in Chapter 8 of the IA-32 Intel® Architecture Software Developer's Manual, Volume 3A: System Programming Guide, Part 1, June 2006.

The microprocessor 100 also includes a storage element 106 for storing a partial reset flag and address coupled to the execution units 122. According to one embodiment, the partial reset flag and dump address 106 reside in a non-user-addressable storage element of the microprocessor 100 that is not cleared by the self-reset that is performed by the microprocessor 100 at block 212 of FIG. 2, which is described below. More specifically, the storage element 106 is cleared by a power-on reset of the microprocessor 100, but is not affected by a non-power-on reset of the microprocessor 100, such as a reset initiated by assertion of a signal on a reset input to the microprocessor 100 or by the self-reset of block 212.

The microprocessor 100 also includes model specific registers (MSRs) 104 coupled to the execution units 122. Operation of the bus interface unit 126, APIC 108, MSRs 104, and partial reset flag and address 106 are described in more detail below.

The microprocessor 100 also includes microcode 144. The microcode 144 includes tracer routines 114 and reset routines 156. The tracer routines 114 are a set of microcode routines that lie dormant until activated by a software write to a control register, e.g., a WRMSR instruction to an MSR 104. The tracer microcode routines 114, also referred to herein as "tracer," may be used as a tool to debug and performance tune the microprocessor 100. Once activated, various events can trigger the tracer 114 to gather processor state information and write it to specified addresses in memory 132.

One way to use tracer 114 is to invoke it on regular intervals. For example, every time the microprocessor 100 has executed and retired N instructions (e.g., 100,000 instructions—the number is specified by the user), tracer 114 dumps the processor state 158 to memory 132. An engineer debugging the microprocessor 100 may then take the processor state 158 from the checkpoints and replay them into a simulator, which may be a software functional model of the microprocessor 100. However, there may be cases where the simulator does not reproduce the bug because there was hidden state of the microprocessor 100 that was not included in the dumped state 158. So, the tracer 114 of the microprocessor 100 of FIG. 1 includes a feature that causes it to reset the microprocessor 100 to clear out its state, and then as part of the reset sequence the reset microcode 156 re-loads the state 158 from memory 132 and resumes execution at the next instruction.

There are some bugs for which the microprocessor 100 must run in this mode (i.e., stopping execution, dumping its state to memory, resetting itself, re-loading its state from memory, and commencing execution) for a long time (e.g., a day) in order for the bug to occur. Unfortunately, in some cases if the tracer 114 reset feature was turned on, the microprocessor 100 would often hangs on the bus 138 before the bug could occur. Broadly speaking, the hangs occurred because a scenario was created in which the microprocessor 100 was being reset but the chipset 128 was not being reset, which normally does not happen, i.e., normally both the microprocessor 100 and chipset 128 are reset together. More specifically, normally the bus interface unit 126 of the microprocessor 100 has sufficient time to initialize itself after a reset before the chipset 128 begins initiating transactions on the bus 138. However, because the microprocessor 100 is now resetting itself without resetting the chipset 128, the chipset 128 may initiate transactions on the bus 138 while the microprocessor 100 is initializing, specifically the bus interface unit 126, resulting in a bus 138 hang.

A second problem created by the tracer 114 resets is that interrupts generated by the chipset 128 to the microprocessor 100 during the reset sequence were being lost. This is because the APIC 108 is reset as part of the microprocessor 100 reset, which caused the APIC 108 to lose its state and not correctly handle interrupts generated by the chipset 128 in the window between the APIC 108 reset and the reload of the previously dumped APIC 108 state from memory.

A solution to the problem described above is described herein; namely, the microprocessor 100 is modified to perform only a partial reset of itself. More specifically, to solve the second problem, the microprocessor 100 does not reset the APIC 108 and does not reload its state 158 from memory 132. To solve the first problem, when tracer 114 requests a microprocessor 100 reset, the bus interface unit 126 obtains ownership of the bus 138, initiates a dummy transaction, and asserts BNR# before resetting the microprocessor 100, and does not reset the APIC 108 or BNR# generation logic 134 within the bus interface unit 126 itself. The flowchart of FIG. 2 describes the operation in more detail. However, first the bus interface unit 126 will be described in more detail.

The bus interface unit 126 includes the BNR# generation logic 134, reset logic 152, and a control register 162. The control register 162 is programmable by the microcode 144 to request the partial reset described herein. According to one embodiment, the control register 162 includes a partial reset bit 146 that is provided to an inverter 148 whose output is provided to a two-input AND gate 142; the AND gate 142 also receives an internal processor reset output 136 from reset logic in the BIU 126, such that the AND gate 142 generates a qualified reset output 154 that is provided to the APIC 108 and to BNR# generation logic 134 of the BIU 126. The internal processor reset output 136 is provided to the remainder of the microprocessor 100. Other embodiments of logic configured to generate the internal processor reset 136 and the qualified reset 154 are contemplated.

Figure 2:
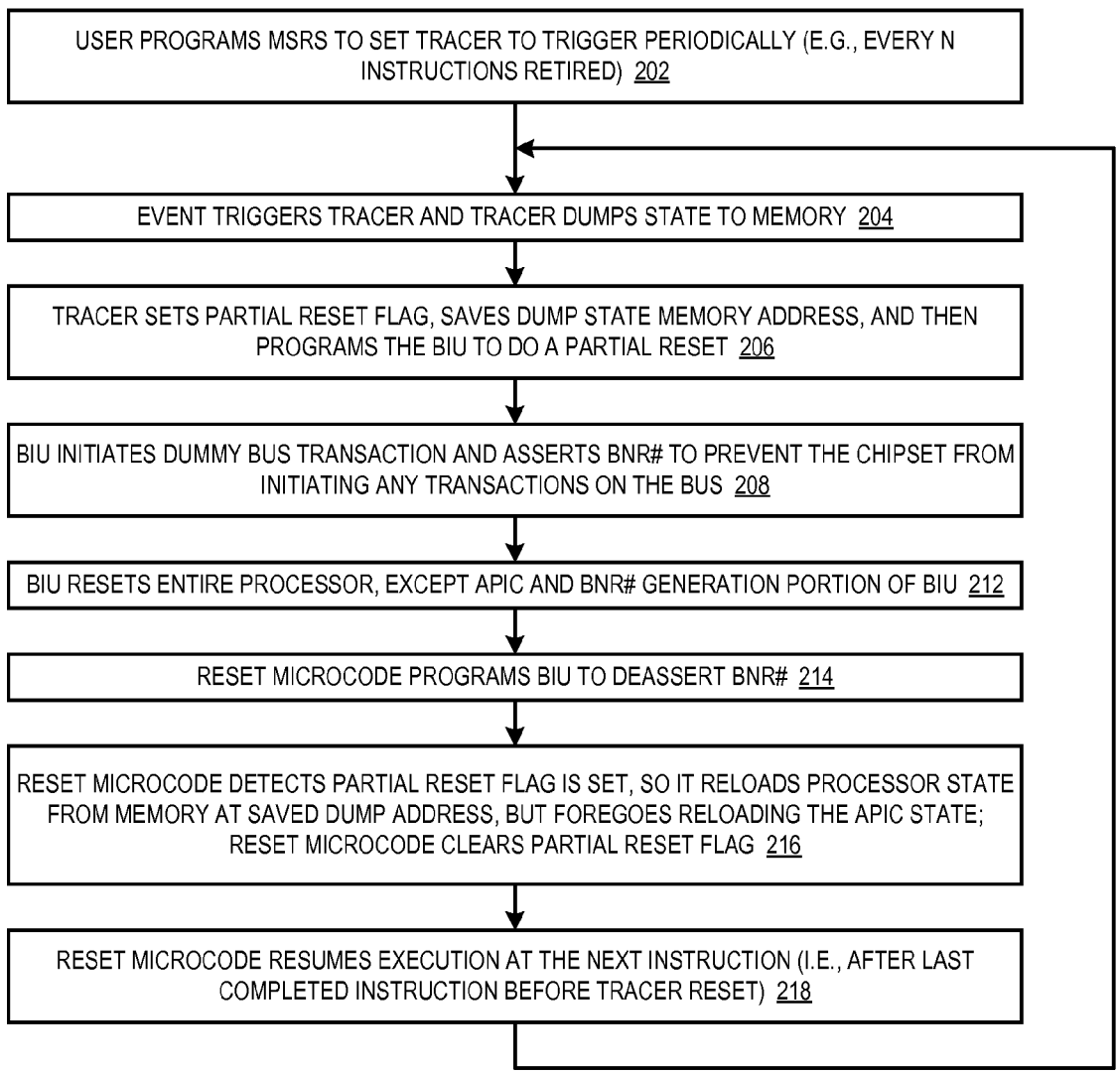
FIG. 2 is a flowchart illustrating the operation of the microprocessor of FIG. 1 according to the present invention.

Referring now to FIG. 2, a flowchart illustrating the operation of the microprocessor 100 of FIG. 1 according to the present invention is shown. Flow begins at block 202.

At block 202, a user programs the MSRs 104 of the microprocessor 100 to trigger tracer 114 periodically, e.g., after every N instructions are retired (e.g., 100,000 instructions). Flow proceeds to block 204.

At block 204, the periodic event triggers tracer 114, and tracer 114 responsively dumps the processor state 158 to memory 132. In one embodiment, tracer 114 performs a write-back-invalidate operation (e.g., executes a WBINVD instruction) before dumping the processor state 158 to memory 132. Flow proceeds to block 206.

At block 206, the tracer 114 microcode sets the partial reset flag 106 and saves the address 106 of the location in system memory 132 to which the processor state 158 was dumped. The tracer microcode 114 then tells the bus interface unit 126 to do a partial reset. Flow proceeds to block 208.

At block 208, the BIU 126 initiates a dummy transaction on the processor bus 138 and asserts BNR# to prevent the chipset 128 from performing any transactions on the bus 138. Flow proceeds to block 212.

At block 212, the BIU 126 resets the microprocessor 100, except for the APIC 108 and BNR# generation logic 134 of the BIU 126. That is, bus interface unit 126 asserts the internal processor reset 136 signals, but does not assert the qualified reset 154 signal in order to forego resetting the APIC 108 and the BNR# generation logic 134. The BIU 126 does not reset the BNR# generation logic 134 so that it continues to assert BNR#. The BIU 126 does not reset the APIC 108 so that it does not miss interrupts while the microprocessor 100 is being reset. Flow proceeds to block 214.

At block 214, in response to the reset performed at block 212, the microprocessor 100 causes the reset microcode 156 to begin executing. The reset microcode 156 instructs the BIU 126 to deassert BNR# (which is already part of the normal reset microcode 156 sequence, e.g., for a reset that was generated from the RESET pin). Flow proceeds to block 216.

At block 216, the reset microcode 156 detects that the partial reset flag 106 is set. Therefore, the reset microcode 156 re-loads the processor state 158 from memory 132 at the dump address 106 that was saved at block 206; however, the reset microcode 156 does not reload the state of the APIC 108. By not reloading the APIC 108 state and instead allowing the APIC 108 to continue responding to interrupts based on its state prior to the reset, the microprocessor 100 advantageously avoids the possibility of missing an interrupt. Additionally, the reset microcode 156 clears the partial reset flag 106. Flow proceeds to block 218.

At block 218, the reset microcode 156 resumes execution at the next user instruction, i.e., the user instruction after the last user instruction that completed before the tracer 114 trigger at block 204. The microprocessor 100 continues to execute user instructions until another event triggers tracer 114 such that flow returns to block 204.

Although embodiments have been described in the context of periodic tracer 114 resets, the invention is more broadly applicable to any scenario in which it is advantageous for the processor to reset itself and in which the chipset will not be reset, because it solves the problem of avoiding the bus hangs. Furthermore, the invention is more broadly advantageous in any scenario in which the processor is to resume processing of interrupts from its pre-reset state, because it solves the problem of losing interrupts.

Furthermore, although embodiments have been described in the context of an x86 architecture-style bus (e.g., having the BNR# signal), other embodiments are contemplated in which other processor buses are employed that have a signal that stalls the bus while the processor comes out of reset.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor capable of partially resetting itself, comprising:
    a bus interface unit, configured to interface the microprocessor to a bus, wherein the bus includes a signal that, when asserted, instructs all agents on the bus to refrain from initiating a transaction on the bus; and
    microcode, configured to:
        cause the bus interface unit to assert the signal on the bus, in response to detecting an event;
        reset the microprocessor, but not reset a portion of the bus interface unit that asserts the signal on the bus; and
        cause the bus interface unit to deassert the signal on the bus, after the microprocessor is reset.

2. The microprocessor of claim 1, wherein the microprocessor is configured to access a memory via the bus, wherein the microcode is further configured to:
    save a state of the microprocessor to the memory, in response to detecting the event and prior to resetting the microprocessor; and
    reload the state of the microprocessor from the memory, after deasserting the signal on the bus.

3. The microprocessor of claim 2, further comprising:
    an interrupt controller;
    wherein the microcode is configured to not reset the interrupt controller when it resets the microprocessor.

4. The microprocessor of claim 3, wherein the microcode is configured to:
    set a flag within the microprocessor, prior to resetting the microprocessor;
    wherein the microcode is configured to determine whether the flag is set and forego reloading the state of the interrupt controller if the flag is set when the microcode reloads the state of the microprocessor from the memory.

5. The microprocessor of claim 4, wherein the microcode is configured to:
    clear the flag, after determining whether the flag is set.

6. The microprocessor of claim 2, wherein the microcode is configured to:
    resume execution of user instructions, after reloading the state of the microprocessor from memory.

7. The microprocessor of claim 1, wherein detecting the event comprises detecting that the microprocessor retired a predetermined number of instructions since its last reset.

8. The microprocessor of claim 1, wherein the signal is a block next request (BNR#) signal.

9. A method for a microprocessor to partially reset itself, wherein the microprocessor includes a bus interface unit that interfaces the microprocessor to a bus, wherein the bus includes a signal that, when asserted, instructs all agents on the bus to refrain from initiating a transaction on the bus, the method comprising:
    asserting, by the microprocessor, the signal on the bus, in response to detecting an event;
    resetting, by the microprocessor, the microprocessor, after said asserting the signal on the bus, but refraining from resetting a portion of the bus interface unit that is said asserting the signal on the bus; and
    deasserting, by the microprocessor, the signal on the bus, after said resetting the microprocessor.

10. The method of claim 9, wherein the microprocessor is configured to access a memory via the bus, the method further comprising:
   saving, by the microprocessor, a state of the microprocessor to the memory, in response to said detecting the event and prior to said resetting the microprocessor; and
   reloading, by the microprocessor, the state of the microprocessor from the memory, after said deasserting the signal on the bus.

11. The method of claim 10, wherein the microprocessor includes an interrupt controller, wherein said resetting the microprocessor comprises refraining from resetting the interrupt controller.

12. The method of claim 11, further comprising:
   setting, by the microprocessor, a flag within the microprocessor, prior to said resetting the microprocessor;
   wherein said reloading the state of the microprocessor comprises determining whether the flag is set and forgoing reloading the state of the interrupt controller if the flag is set.

13. The method of claim 12, further comprising:
   clearing the flag, after said determining whether the flag is set.

14. The method of claim 10, wherein said saving the state of the microprocessor to the memory and said reloading the state of the microprocessor from the memory are performed by microcode of the microprocessor.

15. The method of claim 10, further comprising:
   resuming, by the microprocessor, execution of user instructions, after said reloading the state of the microprocessor from memory.

16. The method of claim 9, wherein said detecting the event comprises detecting that the microprocessor retired a predetermined number of instructions since its last reset.

17. A microprocessor configured to partially reset itself, comprising:
   an interrupt controller; and
   microcode, configured to:
      set a flag, in response to detecting an event;
      save a state of the microprocessor to a memory, in response to detecting the event;
      reset the microprocessor, after setting the flag and saving the state, but not reset the interrupt controller; and
      reload the state of the microprocessor from the memory, after resetting the microprocessor, wherein if the microcode determines that the flag is set, the microcode forgoes reloading the state of the interrupt controller.

18. The microprocessor of claim 17, where the microcode is further configured to:
   clear the flag, after determining whether the flag is set.

19. The microprocessor of claim 17, where the microcode is further configured to:
   resume execution of user instructions, after reloading the state of the microprocessor from memory.

20. The microprocessor of claim 17, wherein detecting the event comprises detecting that the microprocessor retired a predetermined number of instructions since its last reset.

21. The microprocessor of claim 17, further comprising:
   a bus interface unit, configured to interface the microprocessor to a bus, wherein the bus includes a signal that, when asserted, instructs all agents on the bus to refrain from initiating a transaction on the bus;
   wherein the microcode is further configured to:
      assert the signal on the bus, prior to resetting the microprocessor;
      wherein when the microprocessor resets itself, it refrains from resetting a portion of the bus interface unit that asserts the signal on the bus; and
      deassert the signal on the bus, after resetting the microprocessor.

22. The microprocessor of claim 17, wherein the signal is a block next request (BNR#) signal.

23. A method for a microprocessor to partially reset itself, wherein the microprocessor includes an interrupt controller, the method comprising:
   setting, by the microprocessor, a flag within the microprocessor, in response to detecting an event;
   saving, by the microprocessor, a state of the microprocessor to a memory, in response to said detecting the event;
   resetting the microprocessor, by the microprocessor, after said setting the flag and said saving the state, but refraining from resetting the interrupt controller; and
   reloading, by the microprocessor, the state of the microprocessor from the memory, after said resetting the microprocessor, wherein said reloading the state of the microprocessor comprises determining whether the flag is set and forgoing reloading the state of the interrupt controller if the flag is set.

24. The method of claim 23, further comprising:
   clearing the flag, after said determining whether the flag is set.

25. The method of claim 23, wherein said saving the state of the microprocessor to the memory and said reloading the state of the microprocessor from the memory are performed by microcode of the microprocessor.

26. The method of claim 23, further comprising:
   resuming, by the microprocessor, execution of user instructions, after said reloading the state of the microprocessor from memory.

27. The method of claim 23, wherein said detecting the event comprises detecting that the microprocessor retired a predetermined number of instructions since its last reset.

28. The method of claim 23, wherein the microprocessor includes a bus interface unit that interfaces the microprocessor to a bus, wherein the bus includes a signal that, when asserted, instructs all agents on the bus to refrain from initiating a transaction on the bus, the method further comprising:
   asserting, by the microprocessor, the signal on the bus, prior to said resetting the microprocessor;
   wherein said resetting the microprocessor comprises refraining from resetting a portion of the bus interface unit that is said asserting the signal on the bus; and
   deasserting, by the microprocessor, the signal on the bus, after said resetting the microprocessor.

29. The method of claim 23, wherein the signal is a block next request (BNR#) signal.

* * * * *